United States Patent

Riley

[15] 3,648,845

[45] Mar. 14, 1972

[54] THIN FILM SEPARATION MEMBRANES AND PROCESSES FOR MAKING SAME

[72] Inventor: Robert L. Riley, San Diego, Calif.
[73] Assignee: The United States of America as represented by the Secretary of the Interior
[22] Filed: Sept. 2, 1969
[21] Appl. No.: 854,735

[52] U.S. Cl. ..........................210/490, 117/73, 210/500, 264/41
[51] Int. Cl. ....................................B01d 31/00, B01d 13/00
[58] Field of Search..................210/23, 321, 490, 491, 500; 264/41, 46, 49, 317, 298, 331, 257; 117/73, 98

[56] References Cited

UNITED STATES PATENTS

| | | | |
|---|---|---|---|
| 3,198,865 | 8/1965 | Porter et al. | 264/317 X |
| 3,246,764 | 4/1966 | McCormack | 210/321 |
| 3,547,721 | 12/1970 | Dietzsch | 210/321 X |
| 3,551,244 | 12/1970 | Forester et al. | 264/298 X |
| 3,556,305 | 1/1971 | Shorr | 210/490 |

*Primary Examiner*—Frank A. Spear, Jr.
*Attorney*—Ernest S. Cohen and Wm. S. Brown

[57] ABSTRACT

Process for making thin film semipermeable membranes. A porous substrate having pores not greater than about 500 A. at a surface thereof is provided, as by casting from a solution of an organic polymer. A nonporous buffer layer is coated upon that surface to fill the pores, as by applying a water-soluble material, such as polyacrylic acid. The thin film semipermeable membrane is formed in situ upon the buffer layer, as by dipping the coated substrate in a dilute solution of cellulose acetate. A less than 1 weight percent solution of cellulose acetate, having an acetyl content not less than about 39.8 weight percent in chloroform may be used. After drying, the buffer layer is at least partially leached from the composite membrane. The cellulose acetate semipermeable membrane may be less than 1,000 A. in thickness.

11 Claims, No Drawings

THIN FILM SEPARATION MEMBRANES AND PROCESSES FOR MAKING SAME

This application relates to semipermeable membranes and to processes for making such membranes. More particularly, it relates to processes for making ultrathin semipermeable membranes having high flow capacities and good separation characteristics.

It is well known to employ semipermeable membranes to separate components from various fluid mixtures. For example, semipermeable membranes may be employed to separate a liquid component from a mixture of liquids, to separate gaseous components from a gas mixture, and to separate liquid solvents from a liquid solution containing a dissolved solute. Some of these semipermeable membranes are osmotic in nature and as such would normally provide liquid flow thereacross from a solution having a low concentration of solute to a solution having a higher concentration of solute. However, by the application of pressure an excess of a threshold pressure of the particular solution (termed its osmotic pressure) the direction of liquid flow through the membrane can be reversed. Such membranes are often termed reverse osmosis membranes and have recently been employed in the development of better and cheaper devices for providing potable water from brackish or saline water. Methods of making reverse osmosis membranes of this general type from cellulose acetate are disclosed in U.S. Pat. No. 3,133,132 issued May 12, 1964 to Loeb et al.

Although semipermeable membranes have proved acceptable for certain uses, improved versions of semipermeable membranes are always desired, as well as improved processes for making such membranes.

It is an object of the present invention to provide improved semipermeable membranes and methods for making same. Another object is to provide semipermeable membranes having increased rates of flow of permeated fluid therethrough while retaining good separation characteristics. Still another object is to provide improved processes for making semipermeable membranes which are especially suitable for the separation of water from aqueous solutions either to recover potable water or to concentrate a particular aqueous solution. These and other objects of the invention are more particularly set forth in the following detailed description of semipermeable membranes and processes for making the same embodying various features of the invention.

Generally, a process is provided for making improved semipermeable membranes by forming an ultrathin semipermeable membrane in situ upon a porous support member. The composite ultrathin membrane-support member is employed as an integral unit to effect the separation of fluids from fluid mixtures. Ultrathin semipermeable membranes can be formed using this process which are less than a micron in thickness. Inasmuch as it is the semipermeable membrane which determines that a particular fluid component is permitted to pass therethrough while the other components of the mixture are rejected, it follows that the thickness of the semipermeable membrane has a significant effect upon the flow rate at which the particular fluid component will be permitted to pass therethrough. Accordingly, it is believed that if a semipermeable membrane can be produced without imperfections, the thinner the membrane is, the greater will be the flow rate of the fluid permeating therethrough. However, when dealing with membranes having thicknesses less than a micron, it is quite difficult to handle such thin films without creating mechanical imperfections. It has been found that, by forming the ultrathin semipermeable membrane in situ upon the support substrate whereupon it will be employed, it is possible to avoid handling the ultrathin film as a separate entity.

The rate at which fluid will permeate through the composite structure is of course also dependent upon the porosity of the support substrate. Accordingly, it is desirable to have the substrate as porous as possible consistent with its primary function of adequately supporting the ultrathin membrane in an environment where there will be a sizeable pressure differential thereacross, in order to provide the driving force for the permeation operation. To provide such adequate support, it is considered that the support substrate should not contain surface pores of a greater diameter than the thickness of the ultrathin semipermeable membrane to provide a stable operating relationship. Regardless of the relative size of the pores in the substrate and the thickness of the membrane, during the forming operation itself the size of the pores in substrates considered desirable for making high-flow composite membranes is such that these pores are taken into consideration when an ultrathin membrane is cast or otherwise formed in situ from a liquid solution.

It has been found that, by first coating the porous substrate with a barrier layer before forming the ultrathin membrane, the pores in the substrate can be plugged or covered to prevent intrusion of the dilute thin-membrane solution and thereby minimize the imperfections which might result from the presence of relatively large open pores in the surface upon which the in situ forming process is performed. After the formation of the ultrathin membrane is complete, the buffer layer is preferably at least partially dissolved or otherwise removed from the pores so that its presence does not deter the flow of fluid therethrough when the composite membrane is used in a separation device.

In general, separation devices using semipermeable membranes to effect the separation of a first fluid component from a mixture of that first fluid component and a second component are quite well known in the art, and specific constructional details of such devices are not shown in this application. For complete understanding of the invention, it is considered sufficient that it merely be recognized that a separation device employing such a composite membrane might include mounting means for positioning the composite membrane so that a supply of a feed mixture at the desired pressure can be fed to the surface of the composite membrane whereat the ultrathin membrane is located. Likewise, the separation device will have both a system for removing the fluid which permeates through the opposite surface of the composite membrane and a system for removing the feed mixture which has been depleted of the first fluid component. The flow rate of the feed mixture to the separation device and the withdrawal of the depleted mixture are regulated in a manner to maintain the desired feed pressure while keeping the boundary layer effect at the surface of the semipermeable membrane below the limit desired.

In general, the operating effectiveness of a semipermeable membrane is usually discussed both in terms of the percent of rejection by the membrane of a nonpermeating component of the fluid mixture and in terms of the rate of flow of the fluid permeating through the membrane. For example, if the feed mixture consists of an aqueous 1 percent sodium chloride solution and the permeating liquid has a sodium chloride content of 0.02 weight percent the membrane would be said to exhibit a 98 percent rejection of sodium chloride. The flow rate for commercial purposes may be spoken of as gallons per square foot per day at a certain pressure; however, for experimental purposes, "a membrane constant" is measured in terms of grams of permeated liquid per square centimeter of membrane surface, per second of operation and per atmosphere of net pressure (applied pressure minus osmotic pressure). It is noted that a membrane constant of 0.05 g./cm.$^2$-sec.-atm. is equal to 1 gallon per square foot per day at a net pressure of 1,385 p.s.i.

The ultrathin semipermeable membrane may be made from film-forming polymeric organic materials having sufficient strength at thicknesses less than a micron to adequately function in separation devices and which have the necessary selective characteristics to permit the passage of a first fluid component therethrough while rejecting a second component. In general, polymers of cellulose esters and derivatives thereof form ultrathin semipermeable membranes having the above-stated desirable characteristics. Examples of suitable cellulose esters include cellulose acetate, cellulose butyrate, cellulose proprionate, cellulose nitrate, and mixed esters such as cellulose acetate-butyrate as well as modified esters such as an interpolymer of cellulose acetate and polyvinyl-pyrrolidone. Cellulose ethers such as ethyl cellulose also perform acceptably, as well as modified ethers, such as an interpolymer of ethyl cellulose and polyacrylic acid. Polyvinyl polymers, such as cross-linked polyvinyl alcohol, polyvinyl pyrrolidone-polyisocyanate and polyvinyl acetate, are also acceptable.

The support substrate may be made of metals, glass or ceramics having the desired porosity. For example, acid-leached porous glass may be used, such as described in U.S. Pat. Nos. 2,106,744, 2,315,328 and 2,315,329. The support substrate may also be a porous organic polymeric material, and the use of such materials has the advantage of providing a flexible composite membrane which may facilitate the fabrication of the devices which ultimately employ these composite membranes for separation operations.

As previously indicated, the permeability or porosity of the support substrate is quite important. If the support substrate is too porous, the rejection of the nonpermeated component by the composite membrane is often low, apparently because the ultrathin film is inadequately supported and ruptures in the regions of the larger pores in the support substrate upon application of the high feed mixture pressures. On the other hand, if the porosity of the support substrate is too low, the flow rate of the permeating fluid component through the composite membrane may be lower because of the significant pressure drop therethrough, reducing the efficiency of the performance. As a general rule, the maximum surface pore diameter should not be greater than the thickness of the ultrathin film. Inasmuch as it is the intention to provide ultrathin films having thicknesses less than one micron, and preferably in ranges of 1,000 A. and below, support substrates are usually chosen or fabricated having pores not greater than about 500 A. in diameter, and preferably not greater than about 250 A.

One measure of the porosity of a substrate is its void volume, which may be defined as the percentage of unoccupied space within a unit volume. In accordance with the aforegoing considerations, it is believed that the void volume of the support substrate should be at least about 40 percent. Inasmuch as the pressure drop experienced by the permeating fluid will be dependent upon the thickness of the substrate support, it is desirable that the substrate be as thin as possible consistent with the primary support function for which it is employed. It is also important that the substrate material have sufficient internal strength to withstand compaction at the operating pressure differentials to which it will be subjected because compaction of the substrate support increases the pressure drop therethrough and is accordingly undesirable. Although it is clear that materials such as glass, sintered metals, and ceramics would not be subject to such compaction, it is important that organic polymeric materials from which substrate supports might be made have good resistance to compaction.

Support substrates having characteristics meeting the above-mentioned criteria can be produced by casting certain organic polymeric materials under controlled conditions. To carry out such a casting process, a solution is made containing the organic polymeric material in a good solvent therefor, plus a poor or nonsolvent therefor. For example, if cellulose acetate-butyrate is used, it may be dissolved in acetone and to this solution may be added one or more substances which are poor solvents or nonsolvents. For instance, a mixture of ethyl alcohol and butyl alcohol in water might be added to the acetone solution of cellulose acetate-butyrate. A layer of the desired thickness is then cast from combined mixture, as by coating a glass plate having upstanding side runners.

If the support substrate is made from a mixture of cellulose acetate and cellulose nitrate, the same solvent system used with cellulose acetate-butyrate may be employed. If it is desired to use nylon, it may be dissolved in ethyl alcohol and water may be added as a nonsolvent. It is well within the skill of the art to select alternative solvent systems or other organic polymeric materials which might be employed, such as polystyrene or polyvinyl butyral, for example.

The cast cellulose acetate-butyrate layer is allowed to dry under controlled conditions, for example under a high humidity atmosphere which will retain the nonsolvent (water) within the cast layer while the initial evaporation of the good solvent is accomplished. In order to operate in this manner, it is important that the good solvent should have a higher vapor pressure than the poor or nonsolvent employed so that its evaporation will take place first.

When support substrates in the form of porous glass, sintered metals and ceramics are employed they may be used in thicknesses in the neighborhood of 100 to 200 microns. When polymeric organic materials are employed they are generally employed in the range of 10 to 150 microns in thickness. Although the thickness may of course vary depending primarily upon the structural characteristics of the particular polymeric material, such a material is often used having a thickness between about 50 to 60 microns. There are also suitably commercial available substances which may be used as the porous support substrate. For example, porous polymeric substances as sold as Millipore filters may be employed, particularly types VS and VM which are available in mean pore sizes of 250 A. and 500 A., respectively. These Millipore filters are made from a mixture of cellulose acetate and cellulose nitrate. There are also commercially available filters made from cellulose triacetate having suitable pore size.

It is necessary to maintain chemical compatibility between the support substrate material, the barrier material, and the semipermeable membrane material, and particularly with regard to the solvents that may be employed in depositing the barrier material and the semipermeable membrane material. As previously indicated, the barrier material is selected so that it protects the surface of the porous substrate, primarily plugging the pores during the in situ formation of the semipermeable membrane thereupon. So that the barrier material remains in place until the formation of the semipermeable membrane is complete, it is important that it be substantially unaffected by the solvent system employed in forming the semipermeable membrane. Likewise, the barrier material should not undesirably chemically react with the organic polymeric material which constitutes the semipermeable membrane.

As previously indicated, the barrier material should also be subject to at least partial removal by the passage through the composite membrane of a liquid carrier that is compatible with both the ultrathin membrane and the substrate. Inasmuch as the ultrathin membrane is usually cast from an organic solvent, barrier materials which can be removed by the passage of water through the composite membrane are usually employed. However, particularly when a substrate material of glass, sintered metal or ceramic is used so that there is no real problem with regard to the possible effect of the liquid carrier on the substrate, alcohol-soluble barrier materials might be employed with semipermeable membranes which would not be adversely affected by alcohol.

When water is employed as the substance to leach the barrier material from the pores of the composite membrane, it is convenient to use a water-soluble polymer as the barrier material. An aqueous solution of such a polymer can be simply coated upon the porous substrate material and allowed to dry and thus form a protective film across the entire surface of the substrate which effectively plugs the pores. However, buffer materials in the solid form may also be employed which would form a continuous layer and/or plug the individual pores, for example, talcum powder. It might also be possible to employ a relatively viscous liquid which would be retained in and fill the pores at the surface of the substrate where the semipermeable membrane is to be formed. When water-soluble polymers are employed, which are considered the most convenient barrier materials to use, synthetic resins, such as polyacrylic acid, salts of polyacrylic acid, sodium polystyrene sulfonate, polyvinyl alcohol, methyl cellulose, and hydroxypropyl cellulose, are generally employed. For example, sodium polystyrene sulfonate may be used in the form of a linear polymer having a molecular weight between about 40,000 and about 500,000. Natural substances, such as gum arabic, may also be used. As an example, a water solution of polyacrylic acid may be sprayed upon the surface of the support substrate and then dried to form a continuous film before the ultrathin semipermeable membrane is formed. However, the formation of the semipermeable membrane might also be carried out directly upon a substrate which is coated with a viscous water solution of polyacrylic acid that effectively occupies the pores at this surface without drying it.

As previously indicated, the semipermeable membrane is formed in situ atop the layer of barrier material using a solution of the desired organic polymeric material in an organic solvent. Although generally a single solvent solution is employed, more than one solvent may be employed if it would be of advantage for some purpose. The solvent which is used to dissolve the organic polymeric semipermeable membrane material should not attack either the barrier material or the substrate material. Thus, the solvent is usually selected on the basis that it has good solubility for the organic polymeric material and that it is a non-solvent for the particular barrier material and substrate.

In general, it is found that chlorinated hydrocarbons exhibit these properties with respect to groups of prospective ultrathin membrane materials and substrate materials. For example, chloroform exhibits good solubility for cellulose triacetate and does not adversely affect either barrier materials, such as polyacrylic acid, sodium polystyrene sulfonate or polyvinyl alcohol, nor does it adversely affect most organic polymeric material which might be used for the support substrate, such as cellulose diacetate, cellulose nitrate, cellulose acetate-butyrate and nylon. Such a chlorinated hydrocarbon as chloroform might be used by itself or as the major portion of a solvent mixture with other mutually soluble substances, for example, alcohols and dioxane. The chlorinated hydrocarbon would normally be used in an amount of at least 50 volume percent of such a solvent mixture. Methylene dichloride is another chlorinated hydrocarbon which might be employed. To assure satisfactory solubility in a chlorinated hydrocarbon, such as chloroform or the like, it is considered that the cellulose acetate should have an acetyl content of about 41.6 weight percent or greater (true cellulose triacetate having an acetyl content of about 44.8 percent). Cellulose acetate having an acetyl content of about 41 weight percent acetyl or above is preferred.

In general, any suitable coating method can be employed for forming the membrane in situ upon the surface of the support substrate which has been coated with the barrier material. For example, the support substrate may be merely disposed at an angle to the horizontal and the solution poured onto the surface to allow gravity to effect a relatively uniform coating. Preferably, however, the substrate is immersed or dipped into the dilute membrane solution.

The thickness of the ultrathin semipermeable membrane varies with the weight percent of solids in the solution from which it is formed. Normally, a solution of less than 1 weight percent of cellulose acetate is used. For example, when dipping into a room temperature solution of cellulose acetate in chloroform of about 0.6 weight percent is employed (viscosity of about 0.9 centipoises), the resultant semipermeable membrane has a thickness in the neighborhood of 1,500 A. When a concentration of cellulose acetate about 0.4 weight percent cellulose triacetate is employed, the ultrathin film is about 650 A. thick, and when the concentration is about 0.2 weight percent, the film thickness is about 200 A.

The evaporation of the solvent is preferably carried out in a controlled humidity forced draft enclosure so as to maintain reasonably good uniformity across the entire film surface. The temperature at which the evaporation is carried out does not appear particularly critical, and the evaporation may be carried out at room temperature. However, drying at a constant temperature, as for example between about 20° and 30° C., is considered preferable.

The following examples include detailed descriptions of processes which embody various features of the invention. It should be understood, however, that the following examples in no way limit the scope of the invention to these particular processes.

EXAMPLE I

A casting solution for the porous support substrate is formed by first dissolving cellulose acetate-butyrate in acetone at a weight ratio of about 20 parts by weight CAB for each 80 parts of acetone. A mixture is made of 400 milliliters of ethyl alcohol, 300 milliliters of butyl alcohol and 30 milliliters of water. The solution and the alcohol-water mixture are combined to form a casting mixture in the ratio of one milliliter of the alcohol-water mixture for every gram of the acetone-CAB solution. A film about 20 mils thick is cast from the combined mixture upon a glass plate having upstanding side runners using a knifeblade. The glass plate with the cast film coated thereon is disposed in a chamber wherein air at a relative humidity of about 100 percent and a temperature of about 25° C. is slowly circulated. After about 5 hours, the glass plate is removed and the film is dried at room temperature in air having a relative humidity of about 50 percent. Upon completion of the drying process, a porous cellulose acetate-butyrate sheet about 50 microns thick is obtained having a void volume between about 50 and 60 percent. The surface of the CAB sheet which was exposed in the humidity chamber is examined and found to have surface pores measuring no more than about 1,000 thereonto. This technique causes evaporation A. in size.

This exposed surface of the support substrate is coated with a dilute solution of polyacrylic acid in a solvent mixture consisting of equal volumes of ethanol and water. To assure that the barrier material is retained near the surface of the substrate, the substrate is heated to about 80° C. and warm air is blown over it while the solution of the barrier material is sprayed thereonto. This technique evaporation of the solvent almost immediately upon contact, thus forming a polyacrylic acid (PAA) film at the upper surface of the support substrate.

A solution of cellulose acetate having an acetyl content of about 41.6 weight percent is dissolved in chloroform to form a 0.4 weight percent solution. This solution has a viscosity of about 0.75 centipoises at room temperature. The PAA-coated substrate while disposed on the glass plate is immersed in the solution and withdrawn upward, vertically aligned, into a closed chamber where a slow current of dry air is circulated. A uniform coating is obtained by the help of gravity. Evaporation of the chloroform is carried out at about 25° C. and is complete after about 5 minutes. Examination shows that the ultrathin cellulose acetate semipermeable membrane has a thickness of about 650 A.

The resultant composite semipermeable membrane is installed in a test separation device generally similar to that described in U.S. Pat. No. 3,133,132. The lower surface of the cellulose acetate-butyrate support substrate is supported on a piece of filter paper, which in turn rests upon a porous stainless steel plate.

A 1 percent sodium chloride aqueous solution at a temperature of about 25° C. is fed to the separation device adjacent the surface at which the ultrathin semipermeable membrane is disposed. The pressure of the feed mixture is maintained at about 1,500 p.s.i., and sufficient continuous flow of the salt solution is maintained past the surface to keep the effect of the boundary layer at a low level. The liquid permeating through the composite semipermeable membrane is collected for a given time period and measured and tested. The effective surface area of the semipermeable membrane in the test device is about three square inches. Testing of the output liquid shows that the composite membrane effects a salt rejection of about 99.1 percent after about 185 hours of continuous use. The membrane constant measures about $0.60 \times 10^{-5}$ g/cm$^2$-sec.-atm. which is equal to a water flux of about 12 gallons per square foot per day at this pressure. This composite semipermeable membrane is considered to be excellently suitable for separation operations, particularly the production of potable water from a saline or brackish water supply.

EXAMPLE II

An acetone solution of cellulose diacetate and cellulose nitrate is prepared having about 16 weight percent solids. The cellulose diacetate and the cellulose nitrate are present in a weight ratio of about one part of cellulose diacetate to each 6.14 parts of cellulose nitrate. A mixture is made of 400 milliliters of ethyl alcohol, 300 milliliters of butyl alcohol and 30 milliliters of water. This mixture is added to the CA—CN solution in a weight ratio of about 0.75 parts for each part of the acetone solution to produce a combined casting mixture. A layer about 20 mils thick is cast upon a glass plate having upstanding side runners using a knifeblade.

The cast layer is dried at a temperature of about 35° C. by placing the glass plate upon an aluminum plate having a controlled temperature. Operating at this temperature, the porosity of the CA—CN material is controlled by varying the humidity of the air which is circulated during drying. Higher permeability is obtained when drying air having a high humidity is employed. In this instance, the cast sheet is initially dried for approximately 25 minutes using air having a relative humidity of about 100 percent. At the end of this time, the sheet is subjected to radiant heat for a few minutes to complete the drying operation. The examination of the resultant sheet shows that a cellulose diacetate-cellulose nitrate sheet is produced which is about 5 microns in thickness having a void volume between about 50 and about 70 percent. The exposed surface of the CA—CN sheet is examined and is found to have surface pores measuring not greater than about 250 A. in size.

This exposed surface of the CA—CN sheet is coated with polyacrylic acid using the same technique as in Example I.

The cellulose acetate-chloroform mixture formulated in Example I is similarly used to form a film on the PAA-coated surface. Evaporation of the chloroform is carried out in the same manner as in Example I. Examination of the dried composite membrane shows that the thickness of the cellulose acetate ultrathin film is about 650 A.

Testing of the composite film is carried out as in Example I, employing a one percent sodium chloride solution at 25° C. and about 1,500 p.s.i. After about 185 hours of prolonged use under these conditions, measurement shows that the composite membrane exhibits a salt rejection of about 99.5 percent and has a membrane constant of about $0.60 \times 10^{-5}$ g./cm.$^2$sec.-atm. (12 gallons per square foot per day at 1,500 p.s.i.). The composite membrane is considered to be excellently suited for use in such a separation device.

EXAMPLE III

Millipore filters having a thickness of about 5 microns and a mean pore size of about 250 A., which sold under the category VS, are obtained, and a dilute aqueous solution is formed of about 2.5 weight percent polyvinyl alcohol, having a molecular weight of about 50,000. The PVA solution is applied by spraying under the same conditions as in Example I, and a continuous coating of PVA is deposited across the entire surface of the Millipore filter.

The chloroform-cellulose acetate solution formulated in Example I is applied to the PVA-coated surface of the Millipore filter by dipping it therein. Evaporation of chloroform is carried out as in Example I, and examination shows that the ultrathin film of cellulose acetate is about 650 A. in thickness. Testing is carried out as in Example I using a 1 percent aqueous sodium chloride solution at about 25° C. and 1,500 p.s.i. After operation for about 185 hours, the composite membrane exhibits a salt rejection of about 98.5 percent and has a membrane constant equal to $0.4 \times 10^{-5}$ g./cm.$^2$-sec.-atm. (8 gallons per square foot per day at 1,500 p.s.i.). The composite membrane is considered to be well suited for use in separation operations of this type.

The foregoing shows that composite semipermeable membranes can be made using these ultrathin semipermeable films which attain a percentage of salt rejection equal to membranes of this general type previously available while having significantly increased flow rates therethrough. Various of the features of the invention are set forth in the appended claims.

What is claimed is:

1. A process for making composite thin-film membranes suitable for use in a separation device which is adapted to separate a first fluid component from a mixture of that first fluid component and a second component, which process comprises providing a porous substrate having a pore size not greater than about 500 A., coating said substrate with a substantially nonporous buffer layer consisting essentially of polyacrylic acid, depositing a film-forming solution of cellulose acetate in an organic solvent onto said buffer layer, said solvent being nonreactive with said buffer layer and with said substrate, removing said solvent by evaporation to provide an ultrathin cellulose acetate membrane having a thickness less than 1 micron, and at least partially removing said buffer layer by leaching with a carrier therefor which is a nonsolvent for said substrate and for said cellulose acetate.

2. A process in accordance with claim 1 wherein said cellulose acetate has an acetyl content between about 39.8 weight percent and 44.8 weight percent.

3. A process in accordance with claim 2 wherein said solvent is a chlorinated hydrocarbon or solvent mixture including a major portion of a chlorinated hydrocarbon.

4. A process in accordance with claim 3 wherein said chlorinated hydrocarbon is chloroform.

5. A process in accordance with claim 1 wherein said cellulose acetate has an acetyl content greater than about 41 weight percent.

6. A process in accordance with claim 5 wherein said film-forming solution contains less than about 1 percent by weight of cellulose acetate.

7. A process in accordance with claim 1 wherein said buffer material is leached with water.

8. A process in accordance with claim 1 wherein the surface of said porous substrate upon which said barrier material is coated has a maximum pore size which is not greater than the thickness of the ultrathin cellulose acetate membrane.

9. A process in accordance with claim 8 wherein the pores at said surface of said substrate have a mean pore size not greater than about 250 A.

10. A process in accordance with claim 1 wherein said porous substrate is cast from a solution of cellulose nitrate and cellulose acetate.

11. The product resulting from the process of claim 1.

* * * * *